3,610,103
HYDRAULIC POWER LIFTING DEVICE
Heribert Adams, Rosrath, and Franz Heidjann, Oelinghausen, Germany, assignors to Klockner-Humboldt-Deutz Aktiengesellschaft, Cologne-Deutz, Germany
Filed Feb. 11, 1970, Ser. No. 10,430
Claims priority, application Germany, Feb. 12, 1969,
P 19 06 881.6
Int. Cl. F15b *11/16*
U.S. Cl. 91—411 R                                 4 Claims

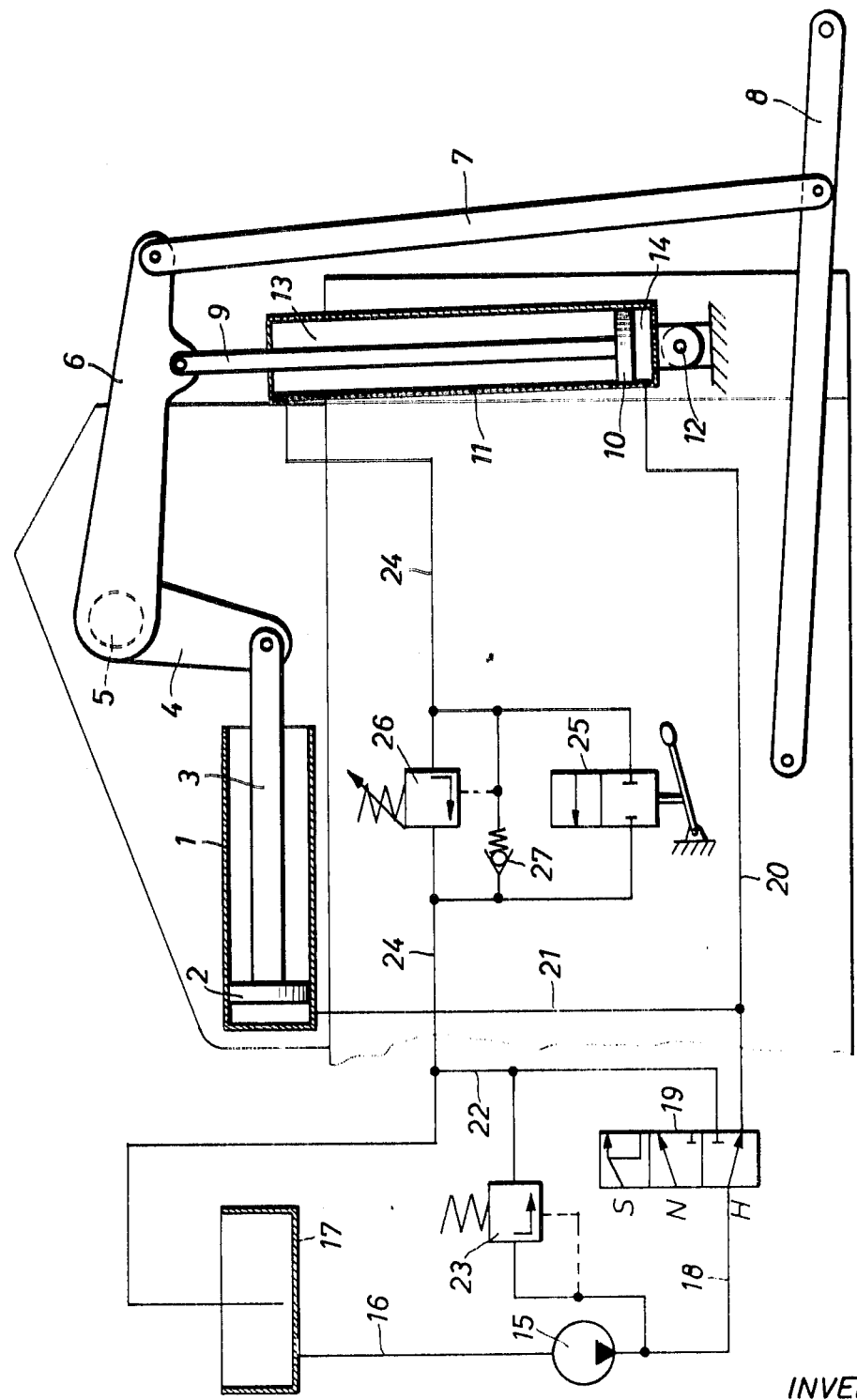

ABSTRACT OF THE DISCLOSURE

A hydraulic power lifting device for use in connection with an agricultural tractor for lifting an implement connecting device, which comprises a main lift cylinder piston system which through the intervention of a linkage system is operable to actuate the implement connecting device and which is aided in its lifting action by at least one double-acting auxiliary cylinder piston system which latter has its cylinder divided by the piston into a first chamber adapted to receive pressure fluid for aiding the main cylinder piston system in the lifting of the implement connecting device, and a second chamber which is adapted to communicate with a fluid reservoir while control means are provided for interrupting said communication.

---

The present invention relates to a hydraulic power lifting device for an agricultural tractor for lifting a working implement connected to an implement connecting device, which comprises a lift cylinder which through a lift shaft and lifting arms connected thereto as well as a linkage system is connected to the implement connecting device while at least one hydraulic auxiliary cylinder is provided for supporting the lift cylinder, said auxiliary cylinder similar to the lift cylinder being connected to a hydraulic control device.

A power lifting device of the above mentioned general type has become known which comprises an auxiliary cylinder arranged laterally on the power lift block and having its piston rod connected to the lift arm located on this side. The auxiliary cylinder is intended to increase the lifting power of the power lifting device.

There has furthermore become known an arrangement according to which with a power lifting device having a single-acting cylinder piston system, the piston is freely movable while the forces act upon the implement connecting device in upward direction. However, agricultural working implements are known which are stern heavy so that when operating such working implements, forces are exerted upon the implement connecting device which have a lifting tendency. In order to prevent such working implements from striking in upward direction, it is necessary that the implement connecting device, in addition to a blocking device which is operable in response to fluid pressure acting upon the cylinder piston system so as to prevent a downward movement, also includes a blocking device for blocking in upward direction. Such blocking in upward direction may be realized by a double-acting cylinder piston system in which that side thereof which faces the piston rod is likewise subjected to a fluid medium for blocking the implement connecting device in upward direction. A double-acting lift cylinder of this type, however, causes difficulties with regard to the sealing of the working chamber at the piston rod side. Moreover, when employing a double-acting lift cylinder, automatically the overall length of the power lifting device is increased.

Mechanical blocking devices are known by means of which the lift shaft is blocked. Such blocking, however, has the drawback that when not properly serviced or actuated, the pressure fluid pump works against an overpressure with the result that the pressure medium will unduly heat up. Furthermore, with this type of blocking, the tractor rail can be arrested only at a certain level above the ground. Moreover, a blocking of the tractor rail in upward direction can be realized by transferring the lifter rods from the lifter arms of the lifting device to a stationary support on the tractor. This, however, requires reassembly work and moreover the tractor rail has to occupy a fixed non-adjustable height above the ground whereby a later connection of implements is made considerably more difficult.

It is, therefore, an object of the present invention to provide an arrangement which will overcome the above mentioned drawbacks.

It is another object of this invention to provide a blocking arrangement for the implement connecting device of an agricultural tractor which will make it possible to adjust the tractor rail for any desired position above the ground and to arrest said tractor rail in upward direction.

These and other objects and advantages of the invention will appear more clearly from the following specification in connection with the accompanying drawing diagrammatically illustrating an embodiment of the device according to the invention.

The device according to the present invention is characterized primarily in that the auxiliary cylinder piston system is designed as a double-acting auxiliary cylinder piston system in which that chamber section which is adjacent the piston rod is filled with a pressure fluid medium and communicates with a pressure fluid reservoir, said communication being adapted selectively to be interrupted.

An auxiliary cylinder piston system of the above mentioned type can later without any difficulties be installed in a power lifting device while the auxiliary cylinder piston system is adapted to be connected to one of the lifter arms or to a member adapted to be actuated by the power lifting device and pertaining to the implement connecting device. The pressure fluid which is trapped in the working chamber after the communication of the latter with the pressure fluid reservoir has been interrupted, prevents the movement of the piston in this direction so that the implement connecting device will be secured against undesired upward movements. The device for interrupting the said connection can easily be actuated from the driver's seat.

According to a further development of the invention, the element for interrupting the said connection has arranged in parallel thereto a pressure relief valve and also a check valve which is blocked from the working chamber. In this connection it is advantageous to make the pressure relief valve adjustable.

Within the frame work of the present invention it has also proved advantageous to provide an auxiliary cylinder piston system the piston rod of which is connected to one of the lifting arms of the power lifting device.

Referring now to the drawing in detail, the illustrated power lifting device comprises a lift cylinder 1 with a piston 2 guided therein. Piston 2 is by means of a piston rod 3 linked to a crank arm 4 of a lift shaft 5. To both sides of the lift shaft 5 there are respectively connected a lift arm 6 each which by means of lift rods 7 respectively are linked to the two lower arms 8 of the implement connecting device. Linked to that arm 6 which with regard to the drawing is located in front is a piston rod 9 the piston 10 of which is guided in an auxiliary cylinder 11. The auxiliary cylinder 11, the lower end of which rests through a joint 12 against a stationary part, is double-acting and above the piston 10 has a first working chamber 13 and below the piston 10 has a second working chamber 14. Both working chambers 13 and 14 are filled with pressure fluid not only in corresponding end positions of piston 10 but are always filled with pressure fluid.

For supplying the power lifting device with pressure fluid, there is provided a pump 15 the suction side of which communicates through a conduit 16 with a pressure fluid reservoir 17 while the pressure side of pump 15 through a conduit 18 communicates with a control valve 19. From control valve 19 extends a conduit 20 to the second working chamber 14 of the auxiliary cylinder 11, and a branch line 21 branching off from conduit 20 leads to the lift cylinder 1 of the power lifting device. Moreover, the control valve 19 is through a return conduit 22 in communication with the pressure fluid reservoir 17. Between the conduits 18 and 22, for protecting the entire installation, there is provided a master relief valve 23 as protection against an overload. A conduit 24 branching off from the conduit 22 leads through a two-way valve 25 to the first working chamber 13 of the auxiliary cylinder 11. An adjustable pressure relief valve 26 and a check valve 27 are arranged in parallel to the two-way valve 25.

The control valve 19 has three control positions, namely "lifting," "neutral" and "lowering." The actuation of the control valve may be effected in any standard manner, for instance, in response to the working resistance encountered by a working implement connected to the implement connecting device.

When the control valve 19 occupies its position "neutral," the pump 15 draws fluid from the reservoir 17 and merely circulates the same through conduits 16, 18 and 22. Also when the control valve 19 is in the position "lowering," ("S" on the drawing) pump 15 merely circulates the fluid while additionally the lift cylinder 1 and the second working chamber 14 of the auxiliary cylinder piston system 11 are through control valve 19 connected to the reservoir 17.

When the control valve 19 occupies its "lifting" position "H" shown in the drawing, pump 15 delivers pressure fluid through conduits 18, 20 and 21 into the lifting cylinder 1 and also into the second working chamber 14 of the auxiliary cylinder 11. Thus, the lifting arms 6 are pivoted in counterclockwise direction so that a working implement connected to the lower arms 8 or a tractor rail arranged between the lower arms will be lifted. The fluid displaced from the first working chamber 13 of the auxiliary cylinder 11 by piston 10 passes through conduit 24 and through the relief valve 26 back to the reservoir 17 during this operation. If now the control valve 19 is shifted to its "neutral" position, the lifting operation is terminated. When operating a stern heavy implement which continuously exerts upwardly directed forces upon the implement connecting device, it is necessary that the pressure relief valve be so adjusted that at the neutral position of the control valve 19 the above mentioned forces will not be able to displace pressure fluid from the first working chamber 13 to the reservoir 17 through piston 10 in the cylinder 11. In this way, the upward striking of a stern heavy working implement will be safely prevented. During a subsequent lowering operation, fluid will in view of the suction effect exerted by the piston 10 pass from the fluid reservoir 17 through conduit 24 and the check valve 24 into the first working chamber 13 of the auxiliary piston 11.

When employing a working implement which exerts only downwardly directed forces upon the implement connecting device, the two-way valve 25 may be moved into its open position so that the fluid medium can during the individual lifting and lowering operations unimpededly flow back and forth between the first working chamber 13 of the auxiliary piston 11 and the fluid reservoir 17 through conduit 24.

If desired, the relief valve 26 and the check valve 27 may be omitted. In such an instance, however, it would be necessary first to adjust the implement connecting device to the desired height while the two-way valve 25 is open.

After closing the two-way valve 25, the piston 10 and the implement connecting device will be secured against upward movement by the fluid which is trapped in the first working chamber 13.

It is, of course, to be understood that the present invention is, by no means, limited to the particular showing in the drawing but also comprises any modifications within the scope of the appended claims.

What we claim is:

1. A hydraulic power lifting device for use in connection with an agricultural tractor, which includes: implement connecting means for connection with an agricultural implement to be pulled by an agricultural tractor, linkage means operatively connected to said implement connecting means, hydraulically operable main cylinder piston means operatively connected to said linkage means for actuating the same to selectively lift and lower said implement connecting means, double-acting hydraulically operable auxiliary cylinder piston means comprising piston rod means pivotally connected to said linkage means for aiding said main cylinder piston means, said auxiliary cylinder piston means also comprising a first cylinder chamber section and a second cylinder chamber section separated from each other by the piston of said auxiliary cylinder piston means, pressure fluid supply means, first conduit means for conveying pressure fluid from said pressure fluid supply means to said main cylinder piston means for causing the latter through said linkage means to lift said implement connecting device and any implement connected thereto, second conduit means for conveying pressure fluid from said pressure fluid supply means to said second cylinder chamber section for causing said auxiliary cylinder piston means to aid said main cylinder piston means in lifting said implement connecting means, fluid storage means, third conduit means connected to said first chamber section for conveying fluid from said fluid storage means to said first chamber section and vice versa, control valve means interposed between said pressure fluid supply means on one hand and said first and second and third conduit means on the other hand and operable to control communication between said main cylinder piston means and said first and second chamber sections selectively with said pressure fluid supply means or said storage means, and means for normally maintaining fluid pressure in said first chamber section.

2. A device according to claim 1, in which the means for normally maintaining fluid pressure in said first chamber section comprises shut-off valve means and relief valve means as well as check valve means, said relief valve means and said check valve means being in parallel arrangement with said shut-off valve means, and said check valve means being blocked from said first chamber section.

3. A device according to claim 2, in which said relief valve means is pressure adjustable.

4. A device according to claim 1, in which said linkage means includes shaft means and lever means pivotable about the axis of said shaft means, and in which the piston rod means of said auxiliary cylinder piston means is pivotally connected to said lever means.

References Cited

UNITED STATES PATENTS

| 1,394,245 | 10/1921 | Berry | 60—52 H.E. |
| 2,350,066 | 5/1944 | Parker | 60—97 HX |
| 3,009,322 | 11/1961 | Mercier | 60—97 HX |
| 3,170,379 | 2/1965 | Dempster | 60—97 HX |

EDGAR W. GEOGHEGAN, Primary Examiner

U.S. Cl. X.R.

91—413; 60—52 H.E., 97 H